Patented June 28, 1932

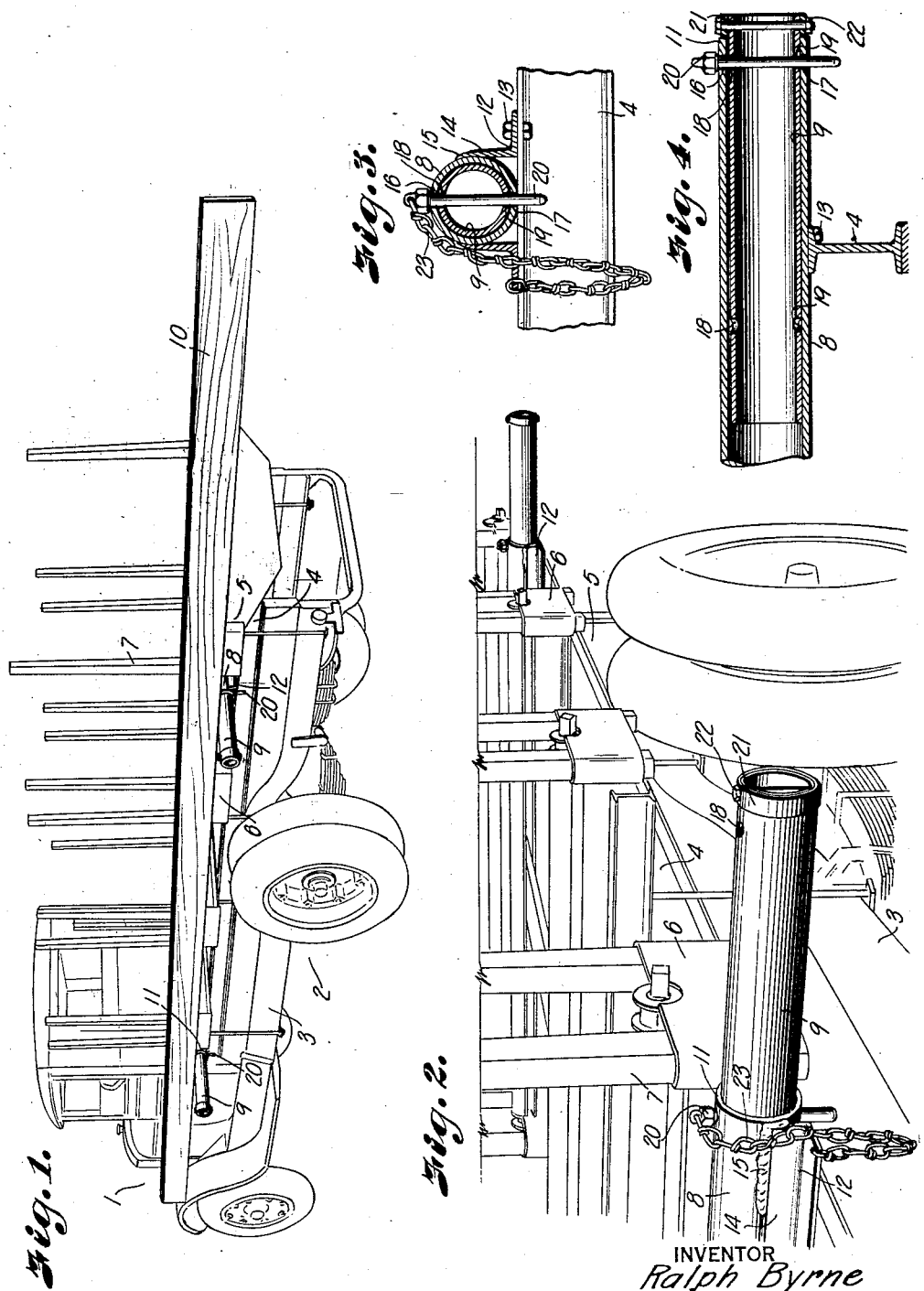

1,864,637

UNITED STATES PATENT OFFICE

RALPH BYRNE, OF KANSAS CITY, MISSOURI

EXTENSION RACK FOR TRUCK BEDS

Application filed March 27, 1929. Serial No. 350,213.

My invention relates to trucks and more particularly to racks supported by a truck chassis, the principal object of the invention being to provide an extensible rack for supporting articles exteriorly of the truck bed and adapted to be retracted when not required for use.

In accomplishing this and other objects of the invention, I have provided improved details of structure, the preferred forms of which are illustrated in the accompanying drawing, wherein:

Fig. 1 is a perspective view of a motor truck equipped with my extension rack and illustrating a timber supported by the rack.

Fig. 2 is an enlarged detail view of a portion of the truck including portions of the rack and illustrating the means for securing the rack members to the truck.

Fig. 3 is a cross section of a rack member and a portion of a truck sill illustrating the means for latching the extensible member to its support.

Fig. 4 is a longitudinal central vertical section of a rack member and supporting sill illustrating the extensible element of the rack in retracted position.

Referring in detail to the drawing:

1 designates generally a motor truck including a chassis 2, a frame 3 including longitudinal sills 4 and a bed 5 including sockets 6 to receive stakes 7. The structure mentioned comprises ordinary elements of a freight vehicle adapted to transport lumber, pipe and the like to be piled on the bed and retained by the stakes.

My invention includes hollow supporting members 8 supported by the sills and adapted to receive extension members 9 which may be moved outwardly laterally of the frame to support relatively long timbers 10 or the like exteriorly of the stakes.

The receiving support members 8 preferably comprise tubes and extend transversely of the bed with their opposite ends 11 projecting slightly beyond the sills, whereby a single tube is adapted to support extension members projectile from opposite sills of the truck.

Angle irons 12 are fixed to the sills by bolts 13 with flanges 14 in suitably spaced relation to receive a tubular support therebetween, and spaced flanges are secured to the tube by means such as welding as indicated at 15 to prevent rotation of the tubes and retain the same in permanent relation with the bed and frame of the truck.

The extensible members 9 are adapted to slide in the supporting and receiving members 8 and preferably comprise tubular legs or bar-like rack arms rotatable in the tubes and having sufficient strength to support a substantial load and having sufficient length to extend into the tubes for rotatable support thereby when projecting outwardly to receive timbers.

Aligned openings 16 and 17 are provided in the projecting end portions 11 of each tube 8 and sets of aligned openings 18 and 19 are formed in each arm 9 whereby a pin 20 may be inserted in the upper opening of the tube and through a selected set of the arm openings for latching the arm to the tube in a selected position either when extending laterally from the truck or retracted into the tube.

Collars or rings 21 are fixed to the outer ends of the tubular arms 9 to serve as stop members for limiting the retractive movement of the arms into the support, and provide flange-like keeper elements for retaining the timber on the arms. Bolts 22 are preferably employed for attaching the collars to the arms, extending through the tubular arms in longitudinal alignment with the openings 18 and 19 therein, and comprising bar-like cross members adapted to be normally positioned vertically.

Chains 23 secured to the pins 20 and angle irons connect the pins with the truck to prevent loss and facilitate operation of the device.

Normally the extensible arms are latched in retracted position, and the truck may be used for transporting relatively small articles, for example lumber of various dimensions. When relatively heavy and cumbersome articles of relatively great length, such as beams, are to be transported, the latching pins are removed and the arms moved slidably to desired projected position, and extend rotatably in the tubes. The bar-like bolts in the arms may be grasped for moving the same.

The arms may then be latched in projecting position by inserting the pins through the tubes and arms, to prevent rotation and displacement, and retain the arms in functioning relation with the bed, and beams may conveniently be loaded at either side of the truck on the arms projecting from that side.

A beam may project forwardly of the front arm on one side of the truck, and rearwardly a considerable distance from the rear arm, for example a distance approximating half the length of the beam, the portion of the beam including its center of gravity being preferably positioned forwardly of the rear arm.

The rack members are adapted to project above the wheels, and may be extended outwardly beyond the wheels, and lateral loading and unloading are thereby facilitated.

The arms may be moved back into the tubes when the beams are removed, and the cross bars will serve as a guide for positioning the arms for inserting the latching pins.

What I claim and desire to secure by Letters Patent is:

1. In a device of the character described including a frame, an extension rack including a tube supported by the frame transversely thereof having an end extending beyond the longitudinal side of the frame, a tubular member slidable in said frame-supported tube having a stop member engageable with the tube for limiting slidable movement of said tubular member, means for latching the tubular member to the tube, and a cross bar in the slidable member for operating the tubular member.

2. An extension rack for truck beds including a pair of telescoping relatively rotatable cylindrical tubular members having series of aligned openings for transverse mounting on a truck bed support, transverse bars for fixing the outer member to said support against rotation, a stop collar on the outer end of the inner one of said members, and a cross bar securing said collar to said member located on the diameter thereof which includes the series of aligned openings therein for guiding the positioning of said inner member to effect registry of the openings therein with the openings in the outer member to receive pins.

3. An extension rack for truck beds having longitudinal sills, a pair of spaced parallel angle members secured transversely to said sills, a tubular member securely mounted between said angle members, a cylindrical extension adapted to telescope in said tubular member, and means for fixing the extension to said tubular member in selected telescoped position.

In testimony whereof I affix my signature.
RALPH BYRNE.